F. J. SCHWARTZ.
SHAFT LUBRICATOR.
APPLICATION FILED MAY 26, 1920.
1,871,817.
Patented Mar. 15, 1921.
3 SHEETS—SHEET 1.
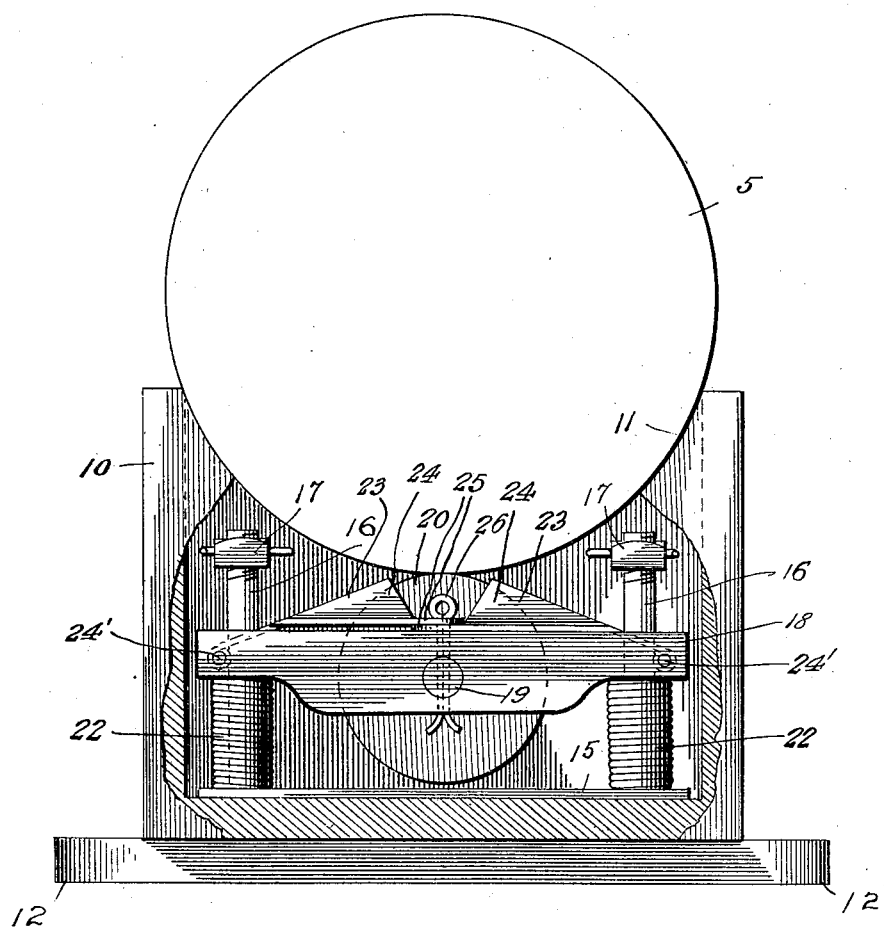
INVENTOR.
Frank J. Schwartz
BY
Norman J. Whitaker
his ATTORNEY.

F. J. SCHWARTZ.
SHAFT LUBRICATOR.
APPLICATION FILED MAY 26, 1920.
1,371,817.
Patented Mar. 15, 1921.
3 SHEETS—SHEET 2.
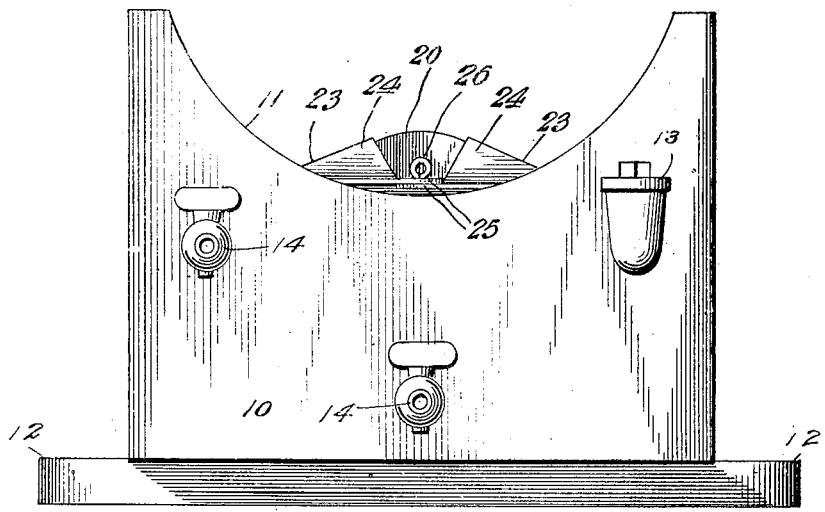
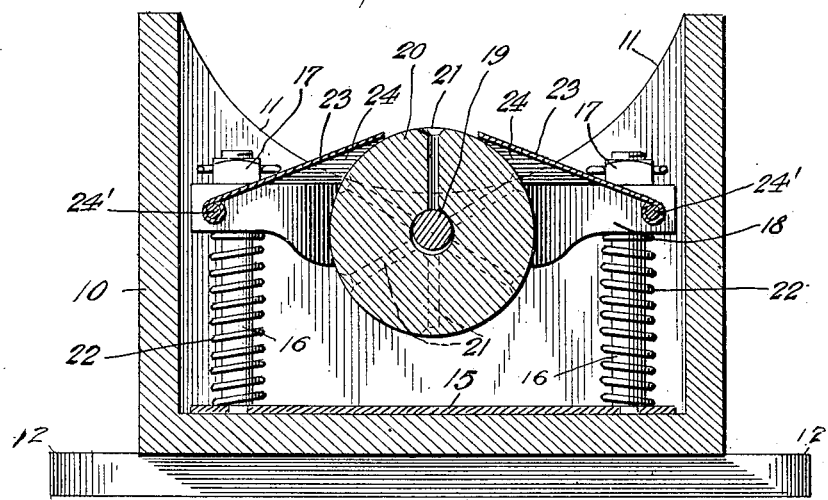
INVENTOR.
Frank J. Schwartz
BY
Norman J. Whitaker
ATTORNEY.

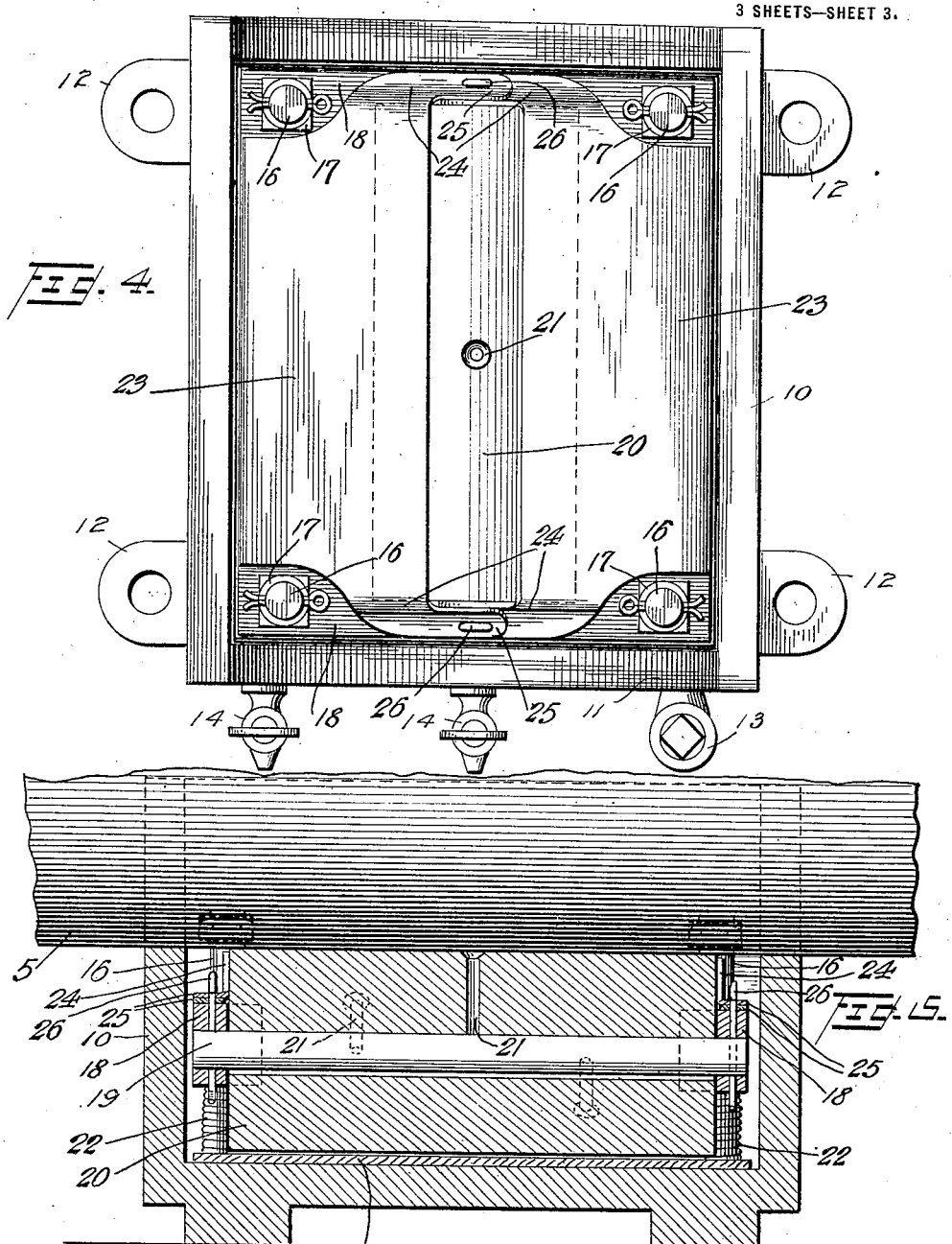

UNITED STATES PATENT OFFICE.

FRANK J. SCHWARTZ, OF AUBURN, NEW YORK.

SHAFT-LUBRICATOR.

1,371,817.         Specification of Letters Patent.   Patented Mar. 15, 1921.

Application filed May 26, 1920. Serial No. 384,336.

*To all whom it may concern:*

Be it known that I, FRANK J. SCHWARTZ, a citizen of the United States, and a resident of Auburn, in the county of Cayuga and State of New York, have invented Shaft-Lubricators, of which the following is a specification.

My invention is a shaft lubricator and is designed principally to automatically supply lubricant to locomotive shafts.

Further, my invention provides a lubricant distributer that will supply or distribute lubricant evenly over the surface of the journaled end of a locomotive shaft, thereby obviating hot-boxes or overheating of the shaft bearings or journals.

My invention also contemplates the use of a spring-urged lubricant applying element engaged by the shaft and rotated thereagainst to continuously submerge the surface of the roller in a lubricant and distribute the same over the surface of the shaft.

The invention further provides the use of shields or guards which prevent splashing of the lubricant due to the rotating distributing roller.

Still another object of the invention resides in the provision of a lubricant distributer which is of comparative simple construction and can be installed upon locomotives and can be used equally as well on shafts or journals subjected to heavy loads and great usage.

With the preceding and other objects and advantages as may be hereinafter outlined the invention consists in the novel combination of elements, construction and arrangement of parts, operations and specific features, all of which will be hereinafter enlarged upon and recited in the subjoined claims.

On the drawings attached hereto,

Figure 1 is an end elevation of the lubricant distributer in operative position, parts being broken away to disclose the interior mechanism;

Fig. 2 is an end elevation of the invention disassembled from the shaft;

Fig. 3 is a vertical transverse sectional view of the same;

Fig. 4 is a top plan view; and

Fig. 5 is a vertical longitudinal sectional view of the device, part of the shaft to be lubricated being shown associated with the same.

Referring in detail to the drawing, wherein like characters of reference designate corresponding parts throughout the several views, the numeral 5 designates a shaft to be lubricated which is shown to illustrate the application of my invention.

The invention consists in a rectangular lubricant reservoir 10 open at its upper end and has a pair of its end walls cut out on a semi-circular line as indicated at 11 to permit the shaft to seat and rotate therein. The reservoir 10 is provided with outstanding ears 12 whereby the reservoir is secured to a suitable base. A filling spout 13 is mounted on one of the end walls of the reservoir adjacent its upper end while drain cocks 14 are likewise mounted upon this wall and are located one above the other so that some of the lubricant may be discharged from the reservoir should the same be filled too great a height, the lowermost drain cock being for the purpose of drawing off sediment and the like.

Removably mounted upon the bottom of the reservoir 10 is a base plate 15 and mounted upon this plate at its opposite ends are pairs of upstanding stems 16 upon the upper ends of which nuts 17 are threaded. Extending transversely of the base plate at each end is a horizontal bar 18 having its ends mounted for vertical movement on a pair of the vertical stems 16. A shaft 19 extends longitudinally of the receptacle or reservoir and has its ends journaled in the horizontal bars 18 centrally of their ends. Revoluble about the shaft 19 is a lubricant distributer roller 20 adapted to rotate through the lubricant contained in the reservoir and carry a film of lubricant to the peripheral face of the shaft. The roller 20 is formed with a plurality of radially disposed ducts or passages 21 which open upon the peripheral face of the roller and the bore of the same to allow lubricant to pass to the shaft 19.

An expansible coil spring 22 encircles each of the vertical stems 16 and engages the base plate 15 and the ends of the bars 18 and urges these bars upwardly to engage the lubricant distributing roller frictionally against the shaft 5. Upon rotation of this shaft the lubricant distributing roller will be rotated to continuously distribute a film of lubricant over the surface of the shaft.

In order to obviate waste of the lubricant due to centrifugal action of the roller 20 shields or plates 23 are disposed between the ends of the bars 18 and are extended at an incline toward each other to overlie part of the roller and have their outer ends hingedly mounted on pins 24' carried by the outer end of the bars 18. These plates or shields 23 are formed with end walls 24 that overlie the ends of the roller 20 and terminate in horizontally disposed ears 25 arranged in overlapping relation and receive cotter keys 26 that pass transversely through the bars 18 and hold these plates or shields against movement.

It will be obvious that the distributing roller will be at all times held against the shaft 5 and as this shaft is rotated the roller will be rotated through the lubricant supply and spread the lubricant over the shaft.

It is to be understood that the form of my invention herein shown and described is to be taken as a preferred example of the same, and that various changes in the shape, size and arrangement of parts may be resorted to without departing from the spirit of the invention or the scope of the subjoined claims.

Having thus described my invention, what I claim as new and desire to secure and protect by Letters Patent of the United States is:

1. A lubricant applying device including a lubricant reservoir, a pair of spring pressed parallel horizontal bars disposed within the reservoir, a rotatable element carried thereby, a pair of plates disposed between the bars and extended toward each other to overlie the rotatable element and having their outer ends hingedly supported between the bars, and means for detachably securing the free ends of the plates against movement.

2. In a lubricant applying device, a receptacle, means for supporting a rotating shaft above the receptacle, a pair of horizontal bars disposed within the receptacle and resiliently urged toward the shaft, a lubricant applying roller journaled between the bars and held against the shaft, a pair of plates disposed between the arms and extended toward each other to overlie the roller, horizontal pins connected to the ends of the bars to which one end of each plate is hinged, end walls carried by the plate and overlying the ends of the roller, ears carried by the walls and disposed in overlapping relation upon the upper face of the bars, and elements detachably securing the ears to the bars.

3. A liquid applying device comprising a receptacle containing liquid, a roller journaled in the receptacle and adapted to contact with a rotary member to be applied with the liquid, a pair of plates pivoted upon opposite sides of the roller and extended toward each other to overlie the roller, and elements for normally securing the free ends of the plates to retain the latter against pivotal movement.

FRANK J. SCHWARTZ.